United States Patent [19]
Marui et al.

[11] Patent Number: 5,134,708
[45] Date of Patent: Jul. 28, 1992

[54] RADIO TELEPHONE APPARATUS

[75] Inventors: Kuniyoshi Marui, Saitama; Kiyoshi Hattori, Tokyo, both of Japan

[73] Assignee: Kabushiki Kaisha Toshiba, Kanagawa, Japan

[21] Appl. No.: 660,555

[22] Filed: Feb. 25, 1991

Related U.S. Application Data

[63] Continuation-in-part of Ser. No. 248,921, Sep. 21, 1988, Pat. No. 4,996,715.

[30] Foreign Application Priority Data

Sep. 29, 1987 [JP] Japan .................................. 62-244621

[51] Int. Cl.⁵ .............................................. A04Q 7/02
[52] U.S. Cl. ................................. 455/33.2; 455/54.1; 455/67.7; 379/63
[58] Field of Search ....................... 455/33, 34, 53, 54, 455/67, 62, 68, 69, 154, 156; 379/59, 60, 61, 63

[56] References Cited

U.S. PATENT DOCUMENTS

| | | |
|---|---|---|
| 4,032,723 | 6/1977 | Mendoza . |
| 4,475,010 | 10/1984 | Huensch et al. . |
| 4,573,206 | 2/1986 | Grauel et al. .......................... 455/33 |
| 4,593,273 | 6/1986 | Narcisse . |
| 4,736,453 | 4/1988 | Schloemer ............................ 455/33 |
| 4,761,806 | 8/1988 | Toki . |
| 4,775,995 | 10/1988 | Chapman et al. . |
| 4,802,201 | 1/1989 | Yoshizawa et al. . |
| 4,850,033 | 7/1989 | Eizenhofer et al. .................. 455/33 |
| 4,939,766 | 7/1990 | Umemoto et al. . |
| 4,996,715 | 2/1991 | Marui et al. . |

FOREIGN PATENT DOCUMENTS

| | | |
|---|---|---|
| 0218450 | 4/1987 | European Pat. Off. . |
| 8705181 | 8/1987 | World Int. Prop. O. ............ 455/33 |

*Primary Examiner*—Reinhard J. Esienzopf
*Assistant Examiner*—Lisa D. Charoue
*Attorney, Agent, or Firm*—Banner, Birch, McKie & Beckett

[57] ABSTRACT

Radio telephone apparatus for use in a cellular mobile telephone system includes an alarm to inform a user of a drop in signal strength of radio frequency signals received over an established communication link. Such a drop occurs, for example, when the user is approaching the boundary of a service area. Further, the mobile unit detect the presence or strength of a tone signal modulated on at least one of the received radio signals. The mobile unit disconnects the telephone link and returns to the standby mode if the tone signal is lost or becomes too weak.

43 Claims, 5 Drawing Sheets

RADIO TELEPHONE APPARATUS

This application is a continuation-in-part of application Ser. No. 07/248,921 filed Sep. 21, 1988, now U.S. Pat. No. 4,996,215.

BACKGROUND OF THE INVENTION

1. Field of the Invention

This invention relates to the field of radio telephone apparatus and more particularly to a mobile telephone unit of a mobile telephone system.

2. Description of the Relevant Art

In cellular mobile telephone systems, a large geographical area is covered and served by breaking the area into a plurality of small zones or cells. Within the combined plurality of small zones, i.e., a service area, a mobile telephone is capable of establishing a communication link with another party. Outside the service area, however, the mobile telephone may not be served by the serving system. Accordingly, when a vehicle equipped with the mobile telephone leaves the service area and a communication link i.e., a speech line with another party has already been established, the communication link may suddenly be disconnected. This sudden break down of an established speech line displeases users.

SUMMARY OF THE INVENTION

It is accordingly an object of the present invention to provide a radio telephone apparatus in which a user may know in advance that the vehicle in which their cellular telephone apparatus is installed is approaching a boundary of the service area.

To achieve the object and in accordance with the purpose of the present invention, as embodied in a first embodiment and described herein, the invention comprises means for receiving signals transmitted over a radio channel; means coupled to the receiving means for measuring the strength of the received signals; signal generating means coupled to the measuring means, and, in the event that a communication link using the channel has already been established, the signal generating means generating a first signal in response to the detection of a signal strength measured by the measuring means below a first criterion and generating a second signal in response to a decrease in signal strength to or below a second criterion; means responsive to the first signal for alarming at least one user of the apparatus; and means responsive to the second signal for causing a disconnection of the communication link.

To achieve the object and in accordance with the purpose of the present invention, as embodied in a second embodiment and described herein, the invention comprises means for receiving signals transmitted over a radio channel; signal strength measuring means coupled to the receiving means for measuring the strength of the received signals; tone signal strength measuring means coupled to the receiving means for measuring the strength of a tone signal modulated on at least one of the received signals, and in the event that a communication link using the channel has already been established, the signal generating means generating a first signal in response to the detection of a signal strength measured by the signal strength measuring means below a first criterion, and generating a second signal in response to the detection of the strength of the demodulated tone signal measured by the tone signal measuring means below a second criterion, means responsive to the first signal for alarming at least one user of the apparatus; and means responsive to the second signal for causing a disconnection of the communication link.

DETAILED DESCRIPTION OF THE PREFERRED EMBODIMENT

Embodiments of the present invention will now be described in detail with reference to the accompanying drawings.

Figure 1:
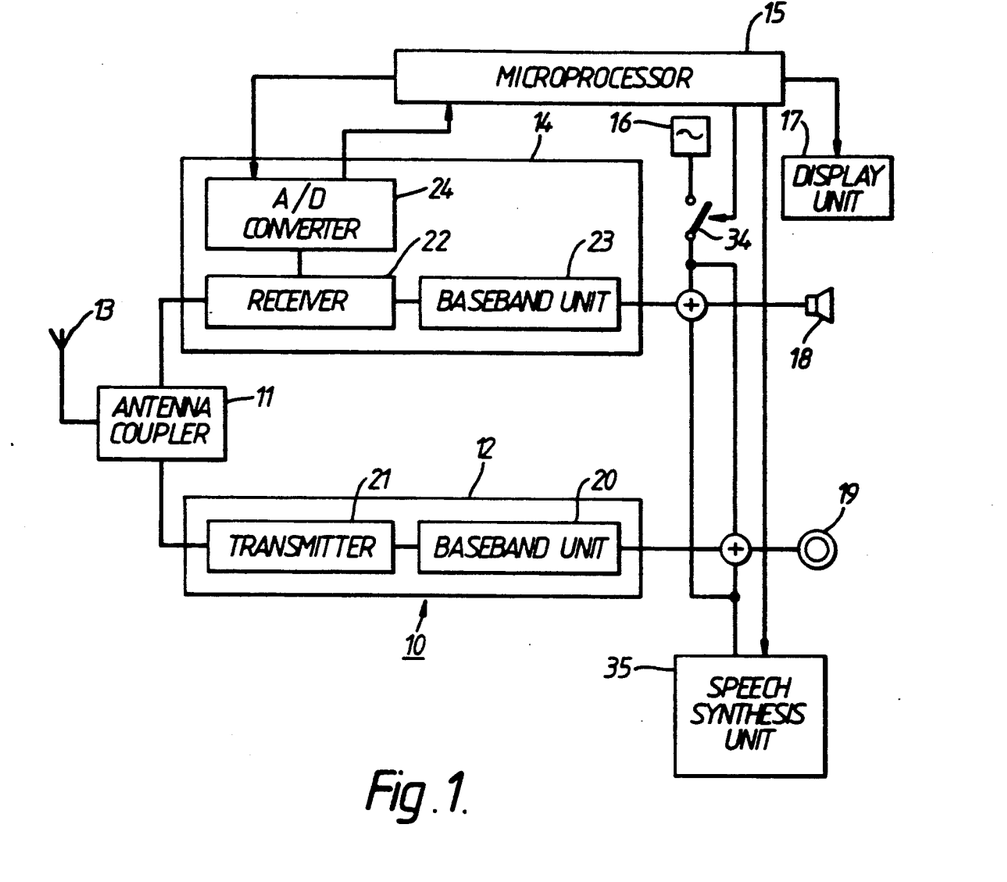
FIG. 1 is a schematical block diagram showing an arrangement of a radio telephone apparatus associated with a first embodiment of the present invention.

FIG. 1 is a block diagram showing an arrangement of a mobile unit associated with a first embodiment of the invention. Mobile unit 10 comprises antenna coupler 11 for transferring signals from transmitter section 12 to antenna 13 and for transferring signals from antenna 13 to receiver section 14, microprocessor 15 for controlling elements of mobile unit 10, oscillator 16 for generating tones, displaying unit 17 for displaying information sent from microprocessor 15, speaker 18 for outputting signals from receiver section 14 or from tone generator 16, microphone 19 for inputting signals to transmitter section 12, switch 34 controlled by microprocessor 15, and speech synthesis unit 35 for synthesizing predetermined speech patterns.

Transmitter section 12 includes baseband unit 20 coupled to an input speech signal for processing signals at baseband frequency and transmitter 21 coupled to the output of baseband unit 20 for modulating the output signal to be broadcast via antenna coupler 11 and antenna 13. Receiver section 14 includes receiver 22 coupled to antenna coupler 11 for demodulating received signals, baseband unit 23 coupled to the output of receiver 22 for processing the received signals, and A/D converter 24 for converting an analog signal supplied thereto to a digital signal responsive to control of microprocessor 15.

Figure 2:
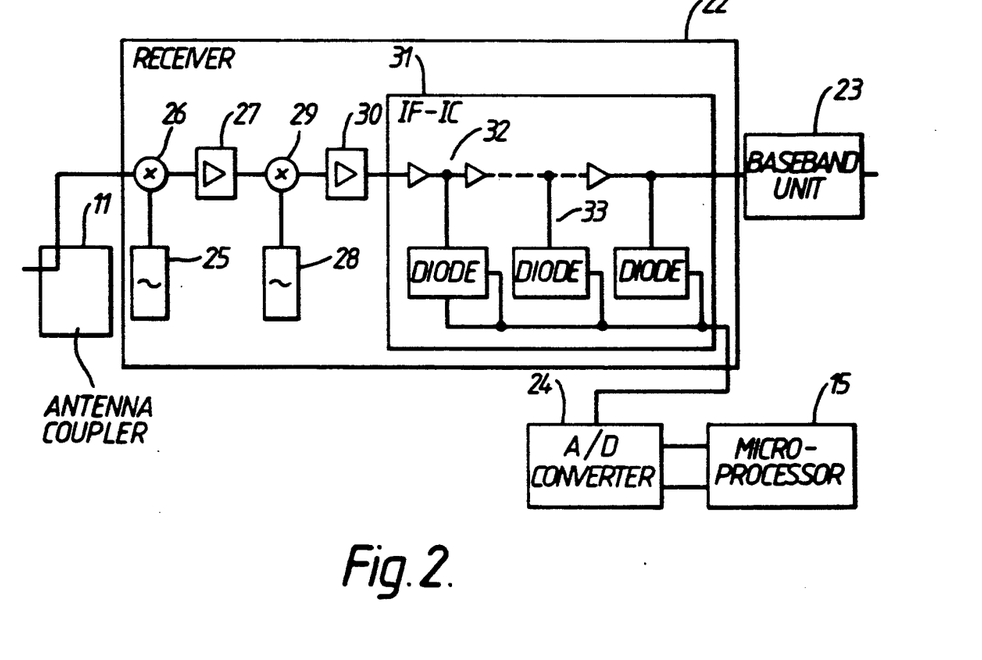
FIG. 2 is a schematical block diagram mainly showing the detail of the receiver in FIG. 1.

More specifically, as shown in FIG. 2, receiver 22 includes first signal source 25, mixer 26 for combining an incoming radio-frequency signal with the signal from first signal source 25, first I-F (intermediate-frequency) amplifier 27 for amplifying the output signal of mixer 26, second signal source 28, mixer 29 for combining the output signal of first I-F amplifier 27 with signal from second signal source 28, second I-F amplifier 30 for amplifying the output signal of mixer 29, and I-F integrated circuit (IC) 31. I-F IC 31 may comprise a plurality of linear amplifiers 32 for amplifying received signals and a plurality of diodes 33 for detecting the strength of received signals.

Figure 3:
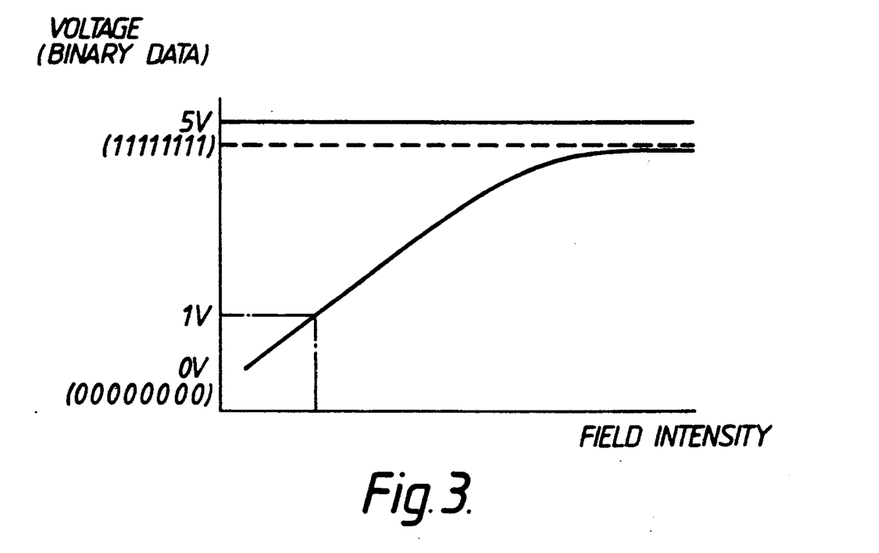
FIG. 3 is a graph of signal field strength versus voltage showing the relationship between the voltage value detected by detectors and field intensity indicative of the strength of received signal.

FIG. 3 shows the relationship between the voltage value detected by the plurality of diodes 33 and field intensity indicative of received radio frequency signal strength. The detected voltage value, for example, 0-5 volts is converted to a digital value having a range, for example, of 00000000-11111111 by A/D converter 24. This digital value is applied to microprocessor 15. When the detected voltage value decreases to a first predetermined value, for example, 1 volt, microprocessor 15 controls switch 34 so that the tone output of oscillator 16 is applied to speaker 18 and transmitter section 12, thereby an alarm sound generated via speaker 18 is likewise transmitted to the radio channel via transmitter section 12. When the detected voltage value decreases to a second lower predetermined value, for example, 0 volts microprocessor 15 controls transmitter section 12 so as to terminate broadcasting and receiver section 14 so as to receive signals from a telephone signal link control channel. A voice synthesized alarm may also be provided by voice synthesis unit 35 as described below.

The operations of mobile unit 10 in accordance with the first embodiment will be described in reference to FIGS. 4 and 5.

In this embodiment, the strength of the received radio frequency signals is checked after a predetermined time interval (steps 401, 402, and 403), for example, every five seconds. The time interval is counted down by a timer of microprocessor 15 or, alternatively, a peripheral unit thereto. After the time delay expires at step 402, the microprocessor continues to step 403.

If the digital value corresponding to the detected signal voltage at step 403 is equal to or lower than the digital value corresponding to a first criterion (step 404), for example, 1 volt, microprocessor 15 activates switch 34 so that the output of oscillator 16 is applied to speaker 18 and to transmitter section 12, thereby an alarm tone generated by oscillator 16 is sounded via speaker 18 and also transmitted to the radio channel via transmitter section 12. Therefore this alarm may also be heard by the other party to the conversation. If the overall duration of the alarm is 400 ms, for example, comprising a repeating nonsilence duration of 100 ms and a silence duration of 50 ms as shown in FIG. 5, users may easily perceive the alarm sound as distinct from other telephone signals and the alarm will not significantly interfere with the telephone conversation.

Furthermore microprocessor 15 may control display unit 17 so that an alarm message, for example, "NEAR BOUNDARY" or "SPEECH LINE DISCONNECT SOON" is displayed. Microprocessor 15 may simultaneously control speech synthesis unit 35 so that an alarm message is sounded via speaker 18 and, on the other hand, transmitted to the radio channel via transmitter section 12 typically after the audible periodic tone (FIG. 5) is sounded. In this case, speech synthesis unit 35 may artificially synthesize speech on the basis of prestored data or reproduce spoken words of the user which have been stored in advance (step 405). On the other hand, in the event that the digital value corresponding to the detected voltage returns to a level above the digital value corresponding to the first criterion (step 404) in the next iteration (the predetermined time interval has lapsed) or measurement at step 411, microprocessor 15 terminates displaying the alarm message and the operation of microprocessor 15 returns to step 401 (via steps 414 and 415).

Next microprocessor 15 checks whether the detected voltage value determined at step 403 is at or below a second criterion (step 407) after setting a timer to a second predetermined interval of, for example, 5 seconds (step 406). As an example, the second criterion may be set to 0 volts. In that case, step 403 would determine if the detected signal voltage has fallen to the second criterion. If the detected signal voltage is not at or below the second criterion, the operation of microprocessor 15 returns to step 401 to check the signal strength again to determine if it is below the first criterion. First, however, the timer turned on at step 406 is turned off at step 413.

If the detected voltage value determined at step 403 is at or below the second predetermined criterion (step 407), it would be normally expected that the five second interval established at step 406 has not yet expired at step 408. Then the timer is set to a third predetermined interval of, for example, 5 seconds at step 409. Once the time expires at step 410, the signal level is checked again at step 411. At box 407, it is again determined if the signal value has remained at or below the second criterion. If so, step 408 is executed. However, time has now expired at step 408 and the mobile telephone receiver returns to a standby mode at step 412. This entails causing a disconnection from the telephone link at a telephone central office including terminating the broadcast from transmitter section 12. Also, receiver section 14 returns to a control channel for receiving telephone link control signals. It may be seen that two sequential measurements of signal level at or below a second criterion are required before the link is disconnected.

The first criterion for signal strength may be equal the second criterion or may be greater than the second criterion. If at step 403 (FIG. 4) the signal strength value decreases below either the first or second criterion (the values being equal in this example), an alarm tone generated by oscillator 16 may be immediately sounded via speaker 18 and also transmitted to the radio channel via transmitter section 12 (and other appropriate indications made, for example, via display 17). Furthermore, microprocessor 15 sets the timer to a second predetermined interval at step 406 of, for example, 5 seconds. Consequently, unless the signal strength value recovers within the second predetermined interval, the communication link will be disconnected at step 412. During the second predetermined interval of time, several indications of an alarm initiated at step 405 continue to be indicted to at least one party to the conversation.

In accordance with a second example and in the event that the second criterion is not the same value as the first criterion but is less than the first criterion for signal strength, two types of alarm indications may be initiated. A first alarm message of a form in accordance with the above i.e. NEAR BOUNDARY may be ordered at step 405. However, in the second embodiment a second indication step may be provided between steps 409 and 410 such that in the first passage through loop 407-411 a more urgent indication is provided for the third predetermined interval. For example, if the signal strength value decreases below the second criterion, urgent types of indicia such as a more rapid periodic alarm tone or a more important displayed message such as "SPEECH LINE DISCONNECT IMMINENT" may be provided until the third predetermined interval lapses. The first, second and third predetermined intervals at steps 401, 406 and 409 are preferably as short as 4-5 seconds to insure that in-use channels are freed for use by others after a reasonable period of time.

Figure 6:
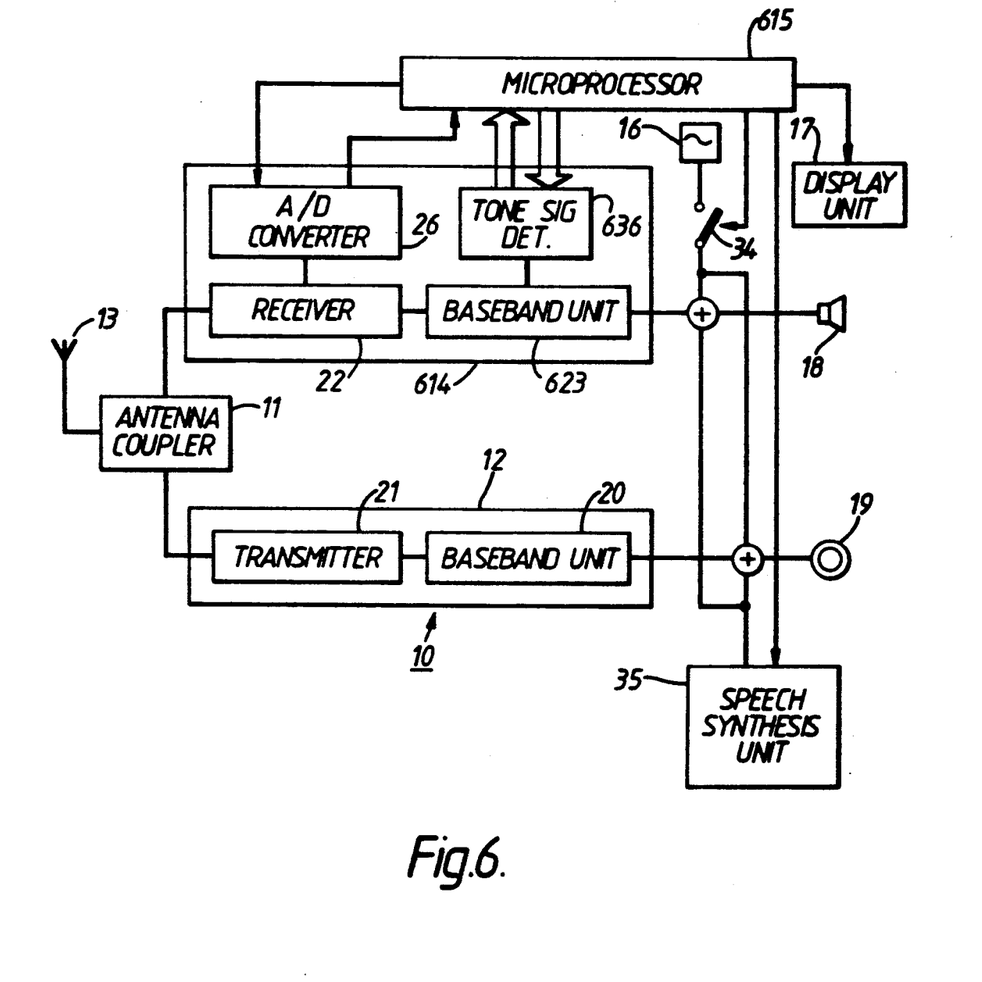
FIG. 6 is a schematical block diagram showing an arrangement of a radio telephone apparatus associated with a second embodiment of the present invention.

FIG. 6 is a block diagram of a mobile unit associated with a second embodiment of the invention. In the second embodiment of the invention, the second criterion is not received signal strength, but instead, is the strength or presence of a demodulated tone signal received from the base station. This tone signal is called the supervisory audio tone (SAT) and is modulated onto a signal transmitted by the base station. Thus, in the second embodiment, the system reacts to a reduction in strength or failure of detection of this tone signal. The presence or strength of the tone signal is the second criterion, and the failure of the signal to meet the second criterion will result in microprocessor 615 terminating the broadcast, and controlling the receiver section 614 so as to receive the signals of a telephone signal link control channel.

The supervisory audio tone signal has a frequency of either 5970 Hz., 6000 Hz., or 6030 Hz. The base station transmits a signal to the mobile unit designating which one of these frequencies is to be transmitted as the supervisory audio tone signal. Of course, the tone signal itself is modulated onto a high frequency signal (800 MHz-900 MHz) which is actually transmitted to the mobile unit. When the mobile unit receives the control signal designating the particular SAT, it waits for a tone signal having the designated frequency. Upon detection of such a tone, the mobile unit determines that a speech communication link has been established and makes the speech radio channel available for speech communication.

Referring to FIG. 6, all elements therein are essentially the same as shown in FIG. 1 with the exception of the receiver section 614. Therefore, only the receiver section will be described in detail here. Receiver section 614 includes receiver 22 coupled to antenna coupler 11 for demodulating received signals, baseband unit 623 coupled to the output of the receiver 22 for processing the received signals, A/D converter 24 for converting an analog signal supplied thereto to a digital signal responsive to the mircroprocessor 615, and a tone signal detection circuit 626 coupled to the baseband unit 623 for detecting the strength or presence of a tone signal modulated on a signal received by receiver 22. The output of tone signal detection circuit 636 is input to microprocessor 615.

Figure 7:
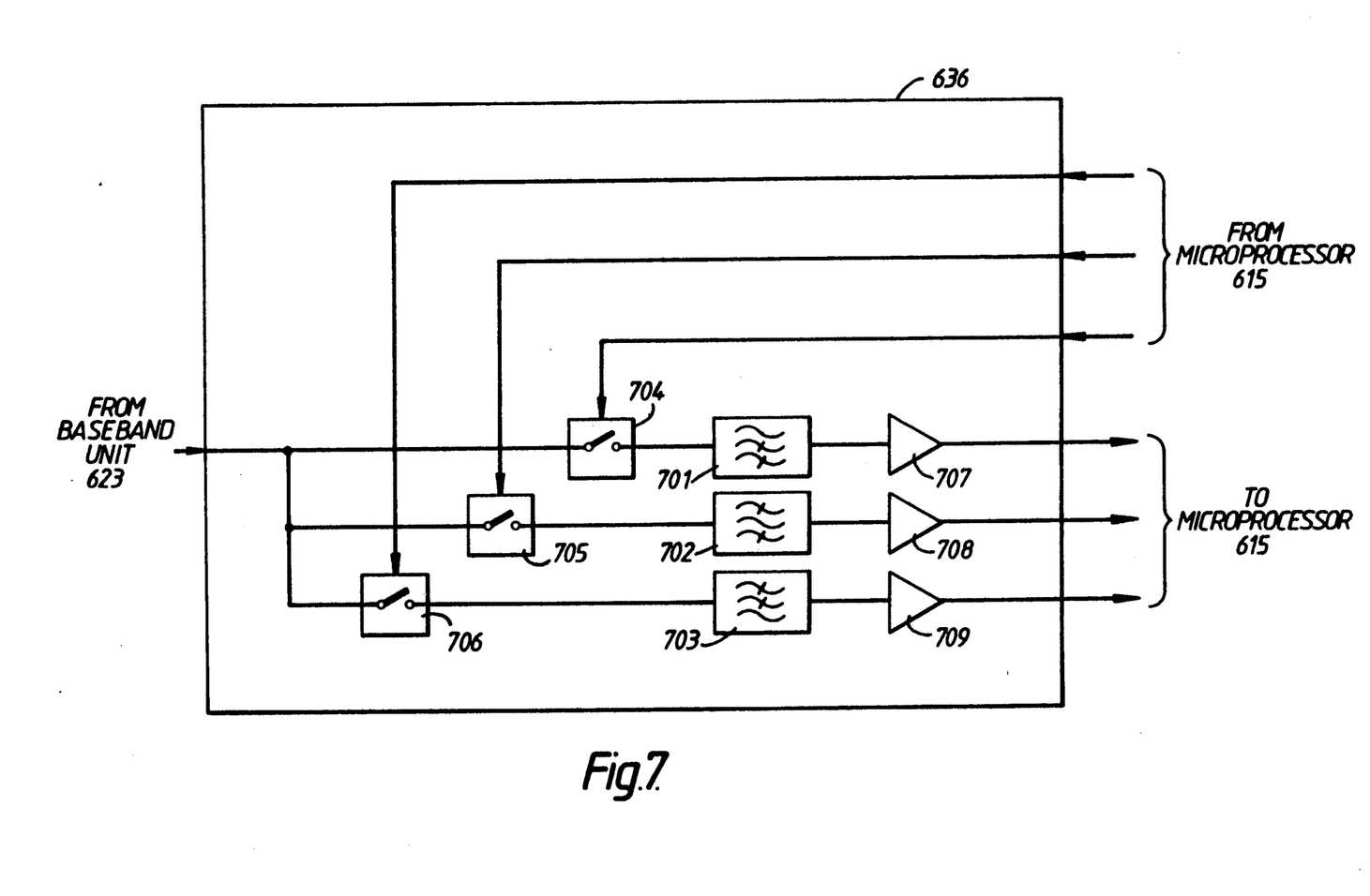
FIG. 7 is a schematical block diagram showing the detail of a tone detection circuit for use in the second embodiment of the invention.

Tone signal detection circuit 636 is shown in more detail in FIG. 7. The tone signal detection circuit comprises three filters 701, 702, and 703 for extracting a tone signal of 6030 Hz., 6000 Hz., or 5970 Hz., respectively out of the signals applied to them. At the input of filters 701–703 are switches 704–706 which selectively connect the filters to the output of baseband unit 623. The switches are controlled by microprocessor 615. Operational amplifiers 707–709 accept the output of filters 701–703, respectively. The outputs of operational amplifiers 707–709 are coupled to microprocessor 615 for analysis. In operation, one of the three switches 704–706 is selectively closed at a time in response to a control signal from microprocessor 615 while the others remain open. The baseband signals from baseband unit 623 are applied to only one of the three filters, depending on the frequency of the tone signal modulated on the received signal received by the receiver.

The operation of this embodiment will be described with reference to FIGS. 6 and 7. First, the base station transmits a control signal over a control channel. The control signal designates the frequency of a tone signal to be transmitted from the base station to indicate a speech communication link under establishment. Upon receipt of the control signal, the microprocessor 615 of the mobile unit activates the one of the switches 704–706 corresponding to a filter which passes the particular frequency (6030 Hz., 6000 Hz., or 5970 Hz.) designated by the control signal.

If the received SAT signal is sufficiently strong, the operational amplifier to which it is directed will output a signal that the microprocessor will recognize as high. Thus, the microprocessor will determine that the tone signal is present and that the second criterion has been met. On the other hand, if the SAT signal is not sufficiently strong, the operational amplifier will output a low signal to the microprocessor. The microprocessor will then determine that the tone signal is weak or absent, and that the second criterion has not been met. Thus, the mobile unit may determine that a speech communication link over a speech channel is properly maintained as long as the microprocessor 615 receives a high level signal from the operational amplifier that corresponds to the frequency designated by the control signal.

Figure 4:
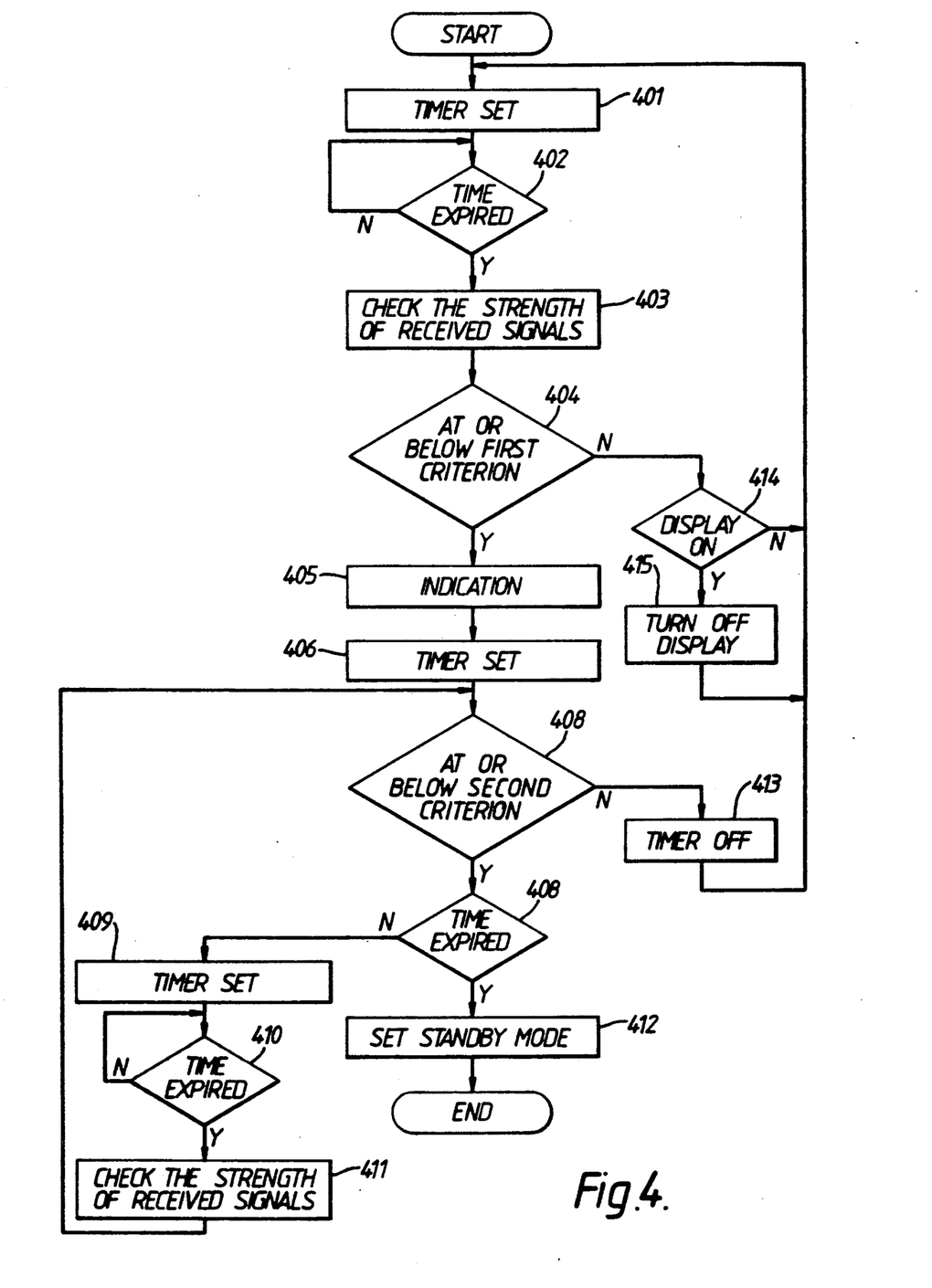
FIG. 4 is a flow chart of an algorithm showing the indication operation of the first embodiment.
Figure 5:
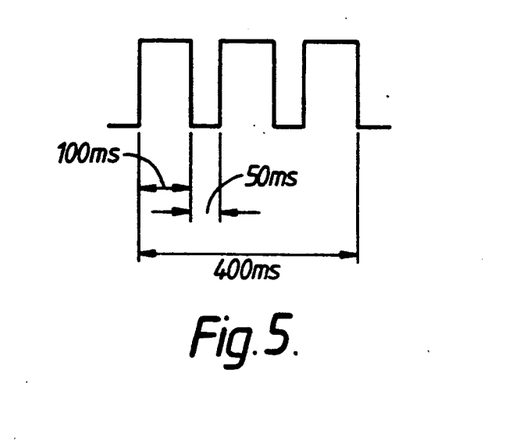
FIG. 5 is a time chart for explaining the provision of an alarm in accordance with the invention.

The overall operation of the system is the same as that detailed in the explanation of FIG. 4, above, except that the second criterion is the strength or presence of the tone signal. Therefore, the explanation will not be repeated in regard to this embodiment. However, it should be noted that devices according to the second embodiment may contain the additional features described in regard to the first embodiment. Such features include, but are not limited to, alarm features, display features, and speech synthesis.

We claim:

1. A cellular radiotelephone unit for use in a cellular radiotelephone system for serving one or more geographic areas formed of a plurality of cellular zones, the cellular radiotelephone unit comprising:

receiving means for receiving radio signals transmitted over a speech radio channel or a control radio channel;

measuring means, coupled to the receiving means, for measuring the strength of the radio signals received by the receiving means;

tone signal measuring means, coupled to the receiving means, for measuring the strength of a tone signal modulated on at least one of said received signals;

alarming means for alarming at least the user of the cellular mobile radiotelephone unit in response to the detection of a signal strength measured by the measuring means at or below a first criterion after a communication link with a second party using a speech radio channel is established; and control means for controlling the receiving means to receive radio signals transmitted over the control radio channel, instead of the speech radio channel, in response to the detection of a tone signal strength measured by the tone signal measuring means at or below a second criterion.

2. The cellular radiotelephone unit of claim 1 wherein the alarming means comprising means for generating sounds and a related sound signal.

3. The cellular radiotelephone unit of claim 2 further comprising means for broadcasting the generated sound signal over the communication link with a second party.

4. The cellular radiotelephone unit of claim 2 wherein the sound generating means comprises speech synthesis means for synthesizing predetermined speech patterns.

5. The cellular radiotelephone unit of claim 2 wherein the generated sounds and related sound signal comprise a periodic signal of less than one second duration in which short periods of tone are interleaved with shorter period of silence.

6. The cellular radiotelephone unit of claim 4 wherein the predetermined speech patterns simulate the voice of the user of the unit.

7. The cellular radiotelephone unit of claim 1 wherein the alarming means comprises a visual display unit.

8. A cellular radiotelephone unit for use in a cellular radio-telephone system for serving one or more geographic areas formed of a plurality of cellular zones, the cellular radiotelephone unit comprising:
   receiving means for receiving radio signals transmitted over a reverse radio channel;
   broadcasting means for broadcasting radio signals to be transmitted over a forward radio channel;
   measuring means, coupled to the receiving means, for measuring the strength of the radio signals received by the receiving means;
   tone signal measuring means, coupled to the receiving means, for measuring the strength of a tone signal modulated on at least one of said received signals;
   alarming means for alarming at least the user of the cellular mobile radiotelephone unit in response to a detection of a signal strength measured by the measuring means at or below a first criterion after a communication link with a second party using the forward and reverse radio channels is established; and
   control means for controlling the broadcasting means to terminate broadcasting radio signals over the forward radio channel in response to a detection of tone signal strength measured by said tone signal measuring means at or below a second criterion;
   the receiving means continuing to receive radio signals transmitted over the reverse radio channel after termination of the signal broadcast over the forward radio channel.

9. The cellular radiotelephone unit of claim 8 wherein the alarming means comprising means for generating sounds and a related sound signal.

10. The cellular radiotelephone unit of claim 9 wherein the sound generating means comprises speech synthesis means for synthesizing predetermined speech patterns.

11. The cellular radiotelephone unit of claim 9 wherein the generated sounds and related sound signal comprise a periodic signal of less than one second duration in which short periods of tone are interleaved with shorter period of silence.

12. The cellular radiotelephone unit of claim 10 wherein the predetermined speech patterns simulate the voice of the user of the unit.

13. The cellular radiotelephone unit of claim 8 wherein the alarming means comprises a visual display unit.

14. A cellular radiotelephone unit for use in a cellular radiotelephone system serving one or more geographic areas formed of a plurality of cellular zones, the cellular radiotelephone unit comprising:
   receiving means for receiving radio signals transmitted over a reverse radio channel;
   broadcast means for broadcasting signals to be transmitted over a reverse radio channel;
   measuring means, coupled to the receiving means, for measuring the strength of the signals received by the receiving means;
   tone signal measuring means, coupled to the receiving means, for measuring the strength of a tone signal modulated on at least one of said received signals;
   sound generating means for generating sounds and a related sound signal;
   means for providing the sound signal generated by the sound generating means to the broadcasting means so that the sounds are transmitted to a second party connected to the user of the unit over a communication link using the forward and reverse radio channels in response to the detection of a signal strength measured by the measuring means at or below a first criterion after the communication link is established; and
   controlling means for controlling the broadcasting means to terminate broadcasting radio signals over the forward radio channel in response to the detection of a tone signal strength measured by the tone signal measuring means at or below a second criterion.

15. The cellular radiotelephone unit of claim 14 wherein the sound generating means comprises speech synthesis means for synthesizing predetermined speech patterns.

16. The cellular radiotelephone unit of claim 14 further comprising display means for providing a visual display indicating the return of the signal strength above the first criterion after the signal strength measured by the measuring means is at or below the first criterion.

17. A method for alarming a user and a second party connected together over a radio communication link, the method for use in a cellular radiotelephone unit, the method comprising the steps of:
   receiving radio signals transmitted over a control radio and a speech radio channel;
   broadcasting radio signals to be transmitted over the speech radio channel;
   measuring the strength of the received radio signals;
   measuring the strength of a tone signal modulated on at least one of the received radio signals;
   providing sounds and a related sound signal, the related sound signal being transmitted to the second party in response to the detection of a signal strength below a first criterion after the communication link using the speech radio channel is established;
   controlling the cellular radiotelephone unit to terminate broadcasting radio signals and to receive signals transmitted over the control radio channel instead of the speech radio channel in response to the detection of a tone signal strength at or below a second criterion.

18. The method of claim 17 further comprising the step of visually displaying an indication when the received signal returns to a level above the first criterion.

19. The method of claim 17 wherein the sounds and related sound signals comprise synthesized speech.

20. Radio telephone apparatus comprising:
  receiving means for receiving signals transmitted over a radio channel;
  measuring means coupled to the receiving means for measuring the strength of the received signals;
  tone signal measuring means coupled to the receiving means for measuring the strength of a tone signal modulated on at least one of the received signals;
  signal generating means coupled to the measuring means and the tone signal measuring means, and in the event that a communication link using the channel has been established, the signal generating means generating a first signal in response to the detection of a signal strength measured by the measuring means at or below a first criterion and for generating a second signal in response to the detection of a tone signal strength measured by said tone signal measuring means at or below a second criterion;
  alarming means responsive to the first signal for alarming at least one user of the apparatus; and
  control means responsive to the second signal for causing a disconnection of the communication link.

21. The apparatus of claim 20 wherein the alarming means comprises means for generating sounds.

22. The apparatus of claim 21 further comprising means for broadcasting the generated sounds over the communication link.

23. The apparatus of claim 21 wherein the sound generating means comprises speech synthesis means for synthesizing predetermined speech patterns.

24. The apparatus of claim 21 wherein the sounds comprise a periodic signal of less than one second duration in which short periods of tone are interleaved with shorter periods of silence.

25. The apparatus of claim 23 wherein the predetermined speech patterns simulate the voice of a user of the apparatus.

26. The apparatus of claim 20 wherein the alarming means comprises a visual display unit.

27. Radio telephone apparatus comprising:
  receiving means for receiving signals transmitted over a radio channel;
  measuring means coupled to the receiving means for measuring the strength of the received signals;
  tone signal detection means coupled to the receiving means for detecting a tone signal modulated on at least one of the received signals;
  signal generating means coupled to the measuring means and the tone signal detection means, and in the event that a communication link using the channel has been established, the generating means generating a first signal in response to the detection of a signal strength measured by the measuring means below a first criterion and for generating a second signal in response to a failure to detect a tone signal by the tone signal detection means;
  alarming means responsive to the first signal for alarming at least one user of the apparatus; and
  control means responsive to the second signal for causing a disconnection of the communication link.

28. The apparatus of claim 27 wherein the alarming means comprises means for generating sounds.

29. The apparatus of claim 28 further comprising means for broadcasting the generated sounds over the communication link.

30. The apparatus of claim 28 wherein the sound generating means comprises speech synthesis means for synthesizing predetermined speech patterns.

31. The apparatus of claim 28 wherein the sounds comprise a periodic signal of less than one second duration in which short periods of tone are interleaved with shorter periods of silence.

32. The apparatus of claim 30 wherein the predetermined speech patterns simulate the voice of a user of the apparatus.

33. The apparatus of claim 27 wherein the alarming means comprises a visual display unit.

34. The apparatus of claim 27 wherein the frequency of said tone signal is one of 5970 Hz., 6000 Hz., or 6030 Hz.

35. A cellular radiotelephone unit for use in a cellular radiotelephone system for serving one or more geographic areas formed of a plurality of cellular zones, the cellular radiotelephone unit comprising:
  receiving means for receiving radio signals transmitted over a speech radio channel or a control radio channel;
  measuring means, coupled to the receiving means, for measuring the strength of the radio signals received by the receiving means;
  tone signal measuring means, coupled to the receiving means, for measuring the strength of a tone signal modulated on at least one of said received signals;
  alarming means for alarming at least the user of the cellular mobile radiotelephone unit in response to the detection of a signal strength measured by the measuring means at or below a first criterion after a communication link with a second party using a speech radio channel is established; and
  control means for controlling the receiving means to receive radio signals transmitted over the control radio channel, instead of the speech radio channel, in response to the detection of a tone signal strength measured by the tone signal measuring means at or below a second criterion.

36. The cellular radiotelephone unit of claim 35 wherein the alarming means comprising means for generating sounds and a related sound signal.

37. The cellular radiotelephone unit of claim 36 further comprising means for broadcasting the generated sound signal over the communication link with a second party.

38. The cellular radiotelephone unit of claim 36 wherein the sound generating means comprises speech synthesis means for synthesizing predetermined speech patterns.

39. The cellular radiotelephone unit of claim 36 wherein the generated sounds and related sound signal comprise a periodic signal of less than one second duration in which short periods of tone are interleaved with shorter period of silence.

40. The cellular radiotelephone unit of claim 38 wherein the predetermined speech patterns simulate the voice of the user of the unit.

41. The cellular radiotelephone unit of claim 35 wherein the alarming means comprises a visual display unit.

42. A communication method for use with a cellular radiotelephone system including a base station and at least one mobile unit by means of radio signals, the method comprising:

transmitting a control signal from the base station to a given mobile station to indicate the frequency of a tone signal that will be transmitted by the base station to indicate the establishment of a communication link;

configuring the mobile unit to detect a tone signal of the frequency indicated by the control signal;

transmitting a tone signal from the base unit to the mobile unit to indicate an attempted establishment of a communication link;

controlling the mobile unit to complete establishment of the communication link;

monitoring the signals received by the mobile unit to determine the strength of the received signals and the strength of the tone signal;

alarming at least one user of the communication system if the signal strength determined by the monitoring step is at or below a first criterion;

disconnecting the communication link if the tone signal strength determined by the monitoring step is at or below a second criterion.

43. A communication method for use with a cellular radiotelephone system including a base station and at least one mobile unit by means of radio signals, the method comprising:

transmitting a control signal from the base station to a given mobile station to indicate the frequency of a tone signal that will be transmitted by the base station to indicate the establishment of a communication link;

configuring the mobile unit to detect a tone signal of the frequency indicated by the control signal;

transmitting a tone signal from the base unit to the mobile unit to indicate an attempted establishment of a communication link;

controlling the mobile unit to complete establishment of the communication link;

monitoring the signals received by the mobile unit to determine the strength of the received signals and the presence of the tone signal alarming at least one user of the communication system if the signal strength determined by the monitoring step is at or below a first criterion;

disconnecting the communication link if the monitoring step indicates that the tone signal is absent.

* * * * *